(12) United States Patent
Keyes et al.

(10) Patent No.: US 6,985,585 B2
(45) Date of Patent: Jan. 10, 2006

(54) CRYPTOGRAPHIC METHOD FOR COLOR IMAGES AND DIGITAL CINEMA

(75) Inventors: Michael P. Keyes, Round Rock, TX (US); Philip E. Cannata, Austin, TX (US)

(73) Assignee: Aevum Corporation, Austin, TX (US)

( * ) Notice: Subject to any disclaimer, the term of this patent is extended or adjusted under 35 U.S.C. 154(b) by 613 days.

(21) Appl. No.: 09/822,960

(22) Filed: Mar. 30, 2001

(65) Prior Publication Data

US 2002/0009197 A1 Jan. 24, 2002

Related U.S. Application Data

(60) Provisional application No. 60/193,895, filed on Mar. 31, 2000.

(51) Int. Cl.
*H04N 7/50* (2006.01)
(52) U.S. Cl. ...................... 380/201; 380/200
(58) Field of Classification Search .............. 713/160, 713/180, 200, 201; 380/201, 28
See application file for complete search history.

(56) References Cited

U.S. PATENT DOCUMENTS 6,505,299 B1 * 1/2003 Zeng et al. ................ 713/160

* cited by examiner

*Primary Examiner*—Gregory Morse
*Assistant Examiner*—Ellen C Tran

(57) ABSTRACT

A method for the encryption and decryption of digital images based on cyclotomic polynomials and radiometric expressions comprising the steps of generating an encrypting transform, partitioning the digital images into data blocks, along with encrypting, transmitting, and decrypting the data blocks. Three common radiometric expressions are fundamental metamers, black metamers, and radiometric functions. In one embodiment, the mathematical equation that represents the encrypting transform is a cyclotomic polynomial. In another embodiment, a cyclotomic polynomial is used to calculate the coefficients of the mathematical equation that represents the encrypting transform. In other embodiments, the encrypting transform is generated with a radiometric expression, and the encrypted data blocks are calculated with a radiometric expression.

28 Claims, 3 Drawing Sheets

CRYPTOGRAPHIC METHOD FOR COLOR IMAGES AND DIGITAL CINEMA

CROSS-REFERENCE TO RELATED APPLICATIONS

This application is entitled to the benefit of Provisional Patent Application Ser. No. 60/193,895 filed Mar. 31, 2000.

FIELD OF THE INVENTION

The invention pertains to the field of cryptography, particularly to the encryption and decryption of digital images used in cinema.

BACKGROUND OF THE INVENTION

Cryptographic systems are used in the communications industries in applications that require some level of security. The need for security arises from the requirement that only the sender and receiver be privy to the information contained in the communications between them. Typically, a cryptographic system is employed in such a way that the sender encrypts the data before it is sent, and the receiver decrypts the data upon receiving it. The data should be encrypted in such a way that a third party cannot interpret it into a useful form if its intercepted during transmission from the sender to receiver.

Typical cryptographic systems are based on the concept of defining a mathematical function that maps the data to the encrypted form. After mapping the data using such a function, the sender transmits the encrypted data. After the encrypted data is received, the inverse of the mathematical function is applied to convert the data back into easily understood form. Typically, the sender and receiver keep secret between themselves some property of the function, called the key, so that a third party would not be able to intercept and decrypt the data without authorization. For example, the coefficients of the equation that is used to encrypt the data would be kept secret.

Examples of the types of data that require cryptographic methods are related to national security, corporate financial assets, and plans for corporate product releases. Typical practitioners of cryptographic methods include national governments, corporations, and financial institutions. These organizations typically protect data such as plain text documents, e-mail, and financial spreadsheets, any of which may be detrimental if enemies of the state or corporate competitors would pirate the information.

In the field of photography, there is a growing need to transmit digital images securely. Digital images are created by either scanning pictures from photographic film or prints, or directly from digital cameras. Professional photographers consider their images to be assets that must be protected from theft, or else financial loss would result. As a result, the digital images are typically in the form of computer files, and the protection must be of the form that prevents pirates from using those files in a meaningful or commercial way.

There is a particular need in the field of cinematography for protecting digital images from piracy. The major studios that produce motion picture movies for cinema have publicly stated their intent to convert from optical projection systems to digital projection systems. The cinema industry will convert from the existing distribution system, which is based on distributing movies on photographic print film, to a system based on the distribution of movies in digitized form. Their concern over security of their movies, in turn, converts from preventing the burglary of the optical prints to preventing the piracy of digital image computer files.

To date, the only security system for digital cinema is the application of cryptographic methods. The digital form of the movie would be encrypted by the studio that owns it. In the encrypted form, the digital movies would be unintelligible, so that the digital movie would be useless to a third party who pirates it. The movies would be transmitted by satellite, or any other suitable medium, to the theater for projection. At the time of projection, the digital movie would be decrypted.

Ideally, the digital movies would be decrypted in "real-time," that is, as the movie is being projected. This places great demands on the cryptographic algorithm. In digital cinema the images would have to be decrypted at 24 images per second if real-time decryption was desired. The minimum size for digital cinema images are 2000×3000 pixels, or 6,000,000 pixels overall. Each pixel comprises three values, one each for red, green, and blue components of the image. Each of these values must be at least 8 bits. The result is that, for real-time cryptographic applications of digital cinema, at least 3.4 gigabits must be decrypted per second.

Currently, classical encryption techniques are being applied to the problem, but they are inadequate for two reasons. First, they are not fast enough for real-time decryption on a frame-by-frame basis. Consequently in many applications, frames are only partially encrypted leaving some of the movie vulnerable for piracy. Also, the frames are only encrypted with an insufficient level of security that allows faster encryption and decryption techniques. But, again, the digital movie is vulnerable for piracy. Second, the classical techniques are limited by hardware storage capacities requiring huge buffering capacity and complex software to manage the input/output of the images.

Elliptical curves have recently been applied in cryptographic solutions. While great strides have been made in their implementation, they are still too slow for digital cinema applications. In their optimum efficiency, quadratic and trinomial equations must be solved for each block of data that is encrypted, resulting in large amounts of computation time.

SUMMARY OF THE INVENTION

The above mentioned disadvantages of the existing art are overcome through the use of cyclotomic polynomials and metameric components of color images in the cryptographic system. The advantages of the invention are especially apparent when the color images comprise a set of images used in digital cinema. In digital cinema, the images in a set are viewed in rapid succession such that the images appear to be moving. The images in digital cinema are typically in digital form; that is, they are encoded in binary form and they are typically stored and transmitted as computer files as is well known in the art.

Cyclotomic polynomials have mathematical properties that are necessary for designing cryptographic systems that have a high level of security, but yet greatly simplify the required mathematical calculations as compared with the other cryptographic systems in the current art. The result is a highly secure cryptographic system with much improved computational efficiency. Some of the advantageous properties of cyclotomic polynomials with respect to cryptographic systems are the roots of cyclotomic polynomials are easily calculated compared with roots of non-cyclotomic polynomials, the coefficients of most cyclotomic polynomials are either 0, −1, or 1, many cyclotomic polynomials are irreducible, One embodiment of cyclotomic polynomials is their use in calculating the coefficients of the elliptical curve equations. Elliptical curves are widely used in secure cryptographic systems. Currently, the roots of the second or third order polynomial equations are calculated to determine the coefficients of elliptical curves. Higher order polynomial equations would be desirable for more secure elliptical curve systems, but the calculations of the roots are intractable for fast cryptographic applications. Cyclotomic polynomials allow for much higher order polynomials, but the roots are easily calculated allowing for easier application to cryptographic applications.

In another embodiment, cyclotomic polynomials are used as the cryptographic function to encrypt the data. That is, instead of using an elliptical curve equation, or other commonly used equation type for encrypting data, cyclotomic polynomials would be used. In current elliptical curve cryptographic systems, coefficients are necessarily very large in order to make the system very secure. It is not uncommon for coefficients of elliptical curves to be greater than $2^{100}$. Because cyclotomic polynomials with higher order can be used, the coefficients may be considerably smaller with no loss of security. Coefficients for cyclotomic polynomials are typically 0, 1, or −1. The advantage of cyclotomic polynomials in this embodiment is computational efficiency.

In another embodiment, the equation to encrypt the data is modulus an irreducible cyclotomic polynomial. Many cryptographic systems use polynomial basis mathematics. In such systems, the equation for encrypting the data is modulus an irreducible, or prime, polynomial. Considerable computation time is typically spent deriving the irreducible polynomial. However, many cyclotomic polynomials are irreducible and their derivation requires considerably less computation time.

Metameric components are calculated directly from the digital images to be encrypted. There are two commonly known metameric components in the field of color science, namely fundamental metamers and black metamers. They are derived from the color properties of the images. They are advantageous for encrypting images because they carry information essential for their encryption and decryption. Any modifications, whether intentional or by chance, to the encrypted images, the state in which the images are most susceptible to piracy, will cause the information carried by the metameric components to change. This results in a failed decryption of the images in attempts at piracy. In this way, the use of metameric components results in a more secure cryptographic system for digital images.

In one embodiment, the metameric components are used to determine the base point that is necessary for cryptographic systems using elliptical curves. In these types of cryptographic systems, the base point is essential for the encryption and decryption of the digital images. The metameric component is essential for determining the base point, and it is inherent in the image itself. If the image is modified in an attempt at piracy, the metameric component is modified and the base point can no longer be properly derived.

In another embodiment, the metameric components are combined with the blocks of image data with an exclusive-or mathematical operation when encrypting the digital images. This operation is well known in the art for being very fast computationally, and it adds another level of complexity to the cryptographic system making it more difficult to decrypt the data without authorization. Indeed, since the metameric component is inherent in the digital image, any modification to the encrypted image in an attempt at piracy modifies the metameric component and the inverse operation of the exclusive-or will not result in the proper decryption of the image.

These and other aspects, objects, features, and advantages of the present invention will be more clearly understood and appreciated from a review of the following detailed description and examples of the preferred embodiments and appended claims, and by reference to the accompanying drawings.

DETAILS OF THE INVENTION

Figure 1:
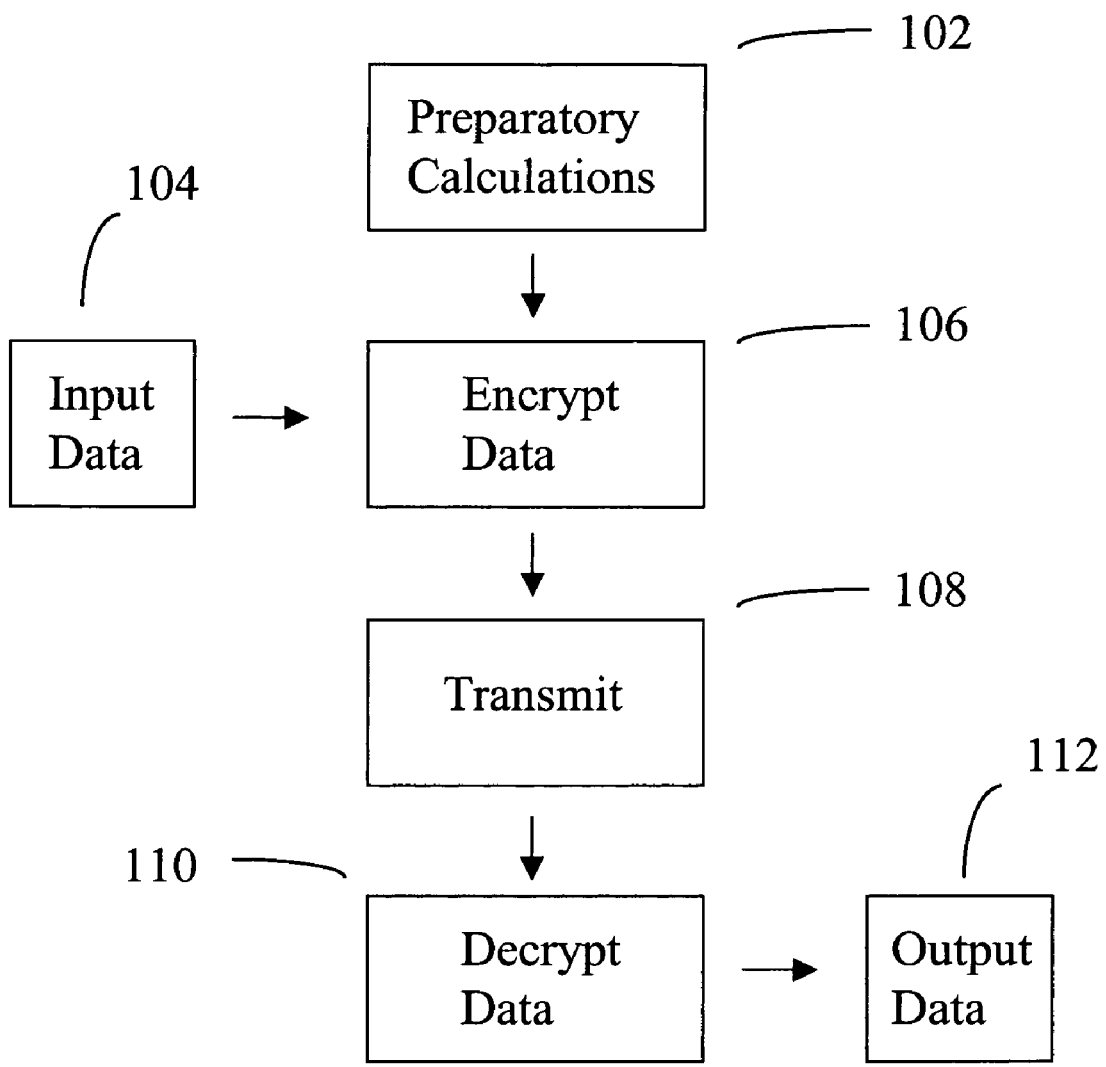
FIG. 1 is a flow diagram illustrating the operation of a cryptographic system incorporating the present invention.

FIG. 1 depicts a typical flow for a cryptographic application. In step 102, preparatory calculations are performed. These calculations are done once for an entire set of data that requires encryption. In step 102, the encrypting transform is generated, wherein the choice is made as to the form of the encrypting transform and the mathematical equation to represent the encrypting transform. For instance, the choice is made to use a certain mathematical curve type such as a polynomial curve, an elliptical curve, or a cyclotomic polynomial curve as the encrypting transform. It is understood from these examples that the form of the encrypting transform is fundamentally algebraic. After this choice is completed, an equation is determined by choosing coefficients for the mathematical equation representing the encrypting transform. Examples of choosing coefficients for equations for elliptical curve types are found in *Implementing Elliptical Curve Cryptography* by Michael Rosing (Manning Publications, 1999) on pages 133–136. Other parameters may be chosen in this step, such as with elliptical curves, a base point is typically chosen, as described by Rosing on pages 174–188.

In step 104, the data is prepared for encryption. Typically the data is partitioned into blocks that are optimal for the transform type and the computational speed desired by the user. The data, for instance, would be partitioned into blocks of 8, 10, or 12 bits. Generally, as the size of the blocks decrease, the number of mathematical operations decrease. In these cases, the computational speed increases and the level of security decrease. Choosing the block size is a trade-off between optimizing the desired computational speed and the desired level of security. Each block would be passed individually and sequentially to Step 106 for encryption.

In step 106, the coefficients for the mathematical equation representing the encrypting transform may be chosen if they were not defined in Step 102. In some cases, the coefficients of the equation are chosen in Step 102. The coefficients would then remain the same for the entire set of data that would be encrypted and transmitted. Alternatively, the coefficients would be determined in Step 106, and there would be a different set of coefficients for each individual block of data that would be encrypted and transmitted. For elliptical curve types, the calculations to determine the coefficients require solving for the roots of either a quadratic or a trinomial equation (Rosing, pages 133–136). In many cryptographic applications, solving for coefficients of quadratic or trinomial equations for every block of data is computationally intense, and the user chooses a less secure system of solving for these coefficients once for the entire set of data in Step 102.

In step 108, the encrypted data is transmitted from the sender to the receiver along with any other data that may be required for the receiver to decrypt the data, such as a base point from the encrypting equation. The encrypted data may be transmitted by any common means known in the art, such as passing a computer CD disk with the encrypted data, sending the encrypted data through standard computer network connections, or sending the encrypted data by radio waves through satellite networks.

In step 110, the receiver decrypts the data using the inverse of the transform that was used to encrypt the data. The unencrypted data is collected and collated in step 112 into a readily understood form.

FIG. 1 will now be described in greater detail with specific reference to the embodiments and advantages of the invention.

Elliptical curves are a set of equations that are currently used for the encryption transform for many cryptographic applications, because they are considered very fast computationally, and very secure. For particularly secure applications, nonsupersingular elliptical curves are used (Rosing, pages 133–136). They take the form, $$y^2+xy=x^3+K_1x^2+K_2 \quad (1)$$

where $K_2$ cannot be 0.

In one example of using elliptical curves for cryptography, the coefficients, $K_1$ and $K_2$, may be chosen in step 102 in FIG. 1. They must be chosen prudently for maximum security and maximum computational efficiency. They may be numerical based or polynomial based. They most often are chosen carefully over fields modulo a large prime number or irreducible polynomial. The coefficients may be chosen from tables such as in Rosing (pages 133–136), or calculated by techniques described by Rosing (pages 133–136) and in the references therein. Assuming the ElGamal protocol is used, a base point, B, on the elliptical curve is also chosen in step 102. The coefficients and the base point are shared between the sender and receiver prior to the transmission of the encrypted data.

In addition to choosing the coefficients, $K_1$ and $K_2$, and the base point, B, both the sender and the receiver, independently, choose a random number, which they keep secret from each other. The sender chooses $k_s$, and the receiver, $k_r$. They each multiply their respective number by the base point, B, to obtain points $P_s$ and $P_r$, both of which are points on the curve defined by (1).

| Sender | $P_s = k_s * B$ | (2) |
| Receiver | $P_r = k_r * B$ | (3) |

The sender sends $P_s$ to the receiver, and the receiver sends $P_r$ to the sender. The use of $P_r$ is further described below in reference to equation (2). The calculation of $P_s$ is optional. It is only used if there is encrypted data to transmit from the receiver to the sender.

The base point, random numbers, $k_s$ and $k_r$, and the coefficients are kept constant for the entire set of data to be encrypted. As compared with calculating different coefficients for each separate block of data as described for Step 106, this case is less secure, but more computationally efficient. If the coefficients are pirated by unauthorized parties, the entire set of data will be in danger of being decrypted by them. However, the set of calculations required for obtaining the coefficients are performed once for the entire set of data, rather than for each block of data. In addition, one set of coefficients is transmitted from the sender to the receiver.

The data is partitioned into separate blocks in Step 104. Each block is successively passed to Step 106, where it is encrypted and transmitted to the receiver. The size of each block is optimized for the desired level of security and computational time as is commonly known in the art.

Typically, each block is represented as a point on the mathematical curve called herein as $P_m$. The point, $P_m$, is derived is by simply using the binary representation of the block of data. The binary representation of the block of data is taken as a high precision integer. In the prior art, ASCII characters are concatenated together to form the block of data. In the present invention, image data comprise the blocks of data. The size of the block of data is typically large enough that the high precision integer typically is greater than $2^{100}$. The high precision integer is used as the x value in the elliptical equation (1), and two roots for y are calculated. One root is chosen to complete the (x,y) pair that defines the point, $P_m$.

In step 106, the sender calculates two points. First, another random number is chosen, q, and multiplied with the base point, B.

$$P_1=q*B \quad (4)$$

The second point is calculated $$P_2=P_m+q*P_r \quad (5)$$

where $P_m$ is the block of data converted to a point on the curve.

Both $P_1$ and $P_2$ are transmitted to the receiver in step 108.

In step 110, the receiver decrypts the encrypted data blocks by applying the inverse of the encrypting transform. With elliptical curves, the following equations are used as the inverse of the encrypting transform.

$$P_3=k_r*P_1 \quad (6)$$

$$\text{and } P_4=P_2-P_3 \quad (7)$$

where $P_4$ is the decrypted data block.

Note that, with substitution of (4), (5), and (6), (7) is equivalent to $$P_4=(P_m+q*k_r*B)-(k_r*q*B) \quad (8)$$

which reduces to $$P_4=P_m \quad (9)$$

In other words, when the receiver calculates $P_4$, the point on the curve with the original encrypted block of data is obtained.

As an alternative to the above described procedure, a set of coefficients may be calculated in Step 106. In this case, each block of data is encrypted with an elliptical curve equation with different coefficients. The result is a more secure, but more cumbersome, cryptographic system. If a third party gains unauthorized access to a set of coefficients, they can only decrypt one block of data. However, the calculations or table references must be performed for every block of data, which adds to the computational complexity of the algorithm and slows the time to perform the encryption. In addition, every set of coefficients must be transmitted to the receiver adding to the overall information that must be communicated and handled by both the sender and receiver.

Cyclotomic polynomials have several properties that allow them advantage in cryptographic applications. They are described in abstract algebra textbooks, such as *A First Course in Abstract Algebra* by Joseph Rotman (Prentice-Hall Inc. 1996). They are generally described as $$\Phi_d(x) = \prod_{k=1}^{d}(x - \xi_k) \quad (10)$$

where $\xi_k = e^{(2\Pi i k/d)}$.

First, except for a few exceptions like $\Phi_{105}$ where the coefficient for the $x^7$ and the $x^{41}$ terms is $-2$, the coefficients of a cyclotomic polynomial are either 0, $-1$ or 1 for all terms. Therefore, the set of coefficients for cyclotomic polynomials is easily represented in binary arithmetic.

Second, many cyclotomic polynomials are considered irreducible ploynomials, or equivalently, prime polynomials. This allows polynomial basis mathematics in cryptographic applications to be modulus a cyclotomic polynomial. It has been proven that a cyclotomic polynomial is irreducible if d is a prime number in equation (10) (Rotman, page 187). In that case, the irreducible cyclotomic polynomial is derived from the following equation.

$$\Phi_d(x) = (x^{d-1})/(x-1) = x^{d-1} + x^{d-2} + \ldots + x + 1 \quad (11)$$

Third, the roots of irreducible cyclotomic polynomials are known in the art as the roots of unity, and they lie equidistant from each other on the unit circle in the complex plane. The complex plane is defined in the field of mathematics as having the x-axis as the real term, and the y-axis as the imaginary term of a complex number. Also, the number of roots is equal to the order of the cyclotomic polynomial. The result is that the roots for irreducible cyclotomic polynomials of any order are easily calculated by mathematical techniques well known in the art as described by Rotman (page 187). Therefore, roots of irreducible polynomials are calculated much more efficiently than for polynomials that are not cyclotomic.

One embodiment of using cyclotomic polynomials in cryptographic applications is in the calculation of the coefficient, $K_2$, when using elliptical curve equations. In the current art, quadratic or trinomial equations are solved to give two or three roots. This step is computationally intense. Indeed, calculating the roots of higher order polynomials would be advantageous because more secure cryptographic systems would result. However, the calculation of the roots of larger order polynomials is intractable for practical cryptographic applications.

The roots of cyclotomic polynomials are easily calculated, regardless of its order. The properties of cyclotomic polynomials are such that the roots of any cyclotomic polynomial are equidistant on the unit circle on the complex plane. Knowing that the number of roots is the same as the order of the polynomial, all the roots are located on the unit circle through simple geometric mathematics. Using cyclotomic polynomials in this embodiment allows for more secure cryptographic applications with more efficient computational time.

Another embodiment is where the polynomial basis mathematics is used modulus an irreducible, or prime, polynomial for applications using elliptical curves, or other appropriate functions, for encrypting the data. The polynomial must be prime or the security of the cryptographic system is compromised. Many cyclotomic polynomials are irreducible allowing the elliptical curve cryptographic applications to be designed with polynomial basis modulus a cyclotomic polynomial. If d is prime in equations (10) and (11), then the resulting cyclotomic polynomial is irreducible (Rotman, page 187).

The preferred embodiment for using cyclotomic polynomials in cryptographic applications is as the equation for encrypting the data. That is, instead of using an elliptical type for the encrypting transform, the cyclotomic curve type is used. With elliptical curve equations, the coefficients are large—usually on the order of $2^{100}$ or greater. These numbers are difficult and cumbersome to program with. Special routines are required because a much higher number of bits per number are needed to maintain the precision than is typically accommodated in standard computer processors. Thus, computational time is consumed during the encryption and decryption processes calling the special routines for handling the high precision coefficients.

The coefficients for all the terms in cyclotomic polynomials, except for a few special cases, are either 0, $-1$, or $+1$. This property allows the coefficients for cyclotomic polynomials to be represented in binary arithmetic in computer processors with no special routines to handle large, high precision numbers as with elliptical curve equations. In addition, whereas the calculation of roots for an elliptical curve is computationally intense, or even intractable, the calculation of the roots of a cyclotomic polynomial is computationally fast and rarely intractable.

When color digital images are the data to be encrypted and decrypted, other embodiments are evident. Digital images are arrays of small entities called pixels. Each pixel represents a portion of the image scene. Such digital images are also known in the art as raw digital images. When the digital images are color digital images, each pixel, typically, has three values representing the three components, red, green, and blue, which together represent the color of that portion of the scene. The three red, green, and blue values together comprise a point in a three dimensional color space defined by an industry standard. There are many such standards. Typically, for any given image, the user understands the industry standard and the three dimensional color space in which the red, green, and blue values are defined. Examples of these color spaces and industry standards can be found in any color science textbook. A noteworthy one is *A Technical Introduction to Digital Video,* by Charles Poynton (Wiley & Sons, 1996).

The red, green, and blue values for each pixel can be converted to other color spaces with transforms that can be found in color science textbooks such as Poynton's. In one embodiment of this invention, the red, green and blue values are converted to a color space known in the art as CIE XYZ space (Poynton, pages 147–148). For example, when the red (R), green (G), and blue (B) values are according to the color science industry standard known as Rec. 709, the CIE XYZ values are determined by the following matrix multiplication:

$$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} \cdot \begin{bmatrix} R \\ G \\ B \end{bmatrix}$$

Once in CIE XYZ space, the color of that the pixel is broken down into the metameric components referred to as a fundamental metamer and a black metamer. The procedure and mathematics are described in detail in a paper by Jozef B. Cohen and William E. Kappauf entitled, *Color Mixture and Fundamental Metamers: Theory, Algebra, Geometry, Application* (*American Journal of Psychology* 98, 171–259, 1985).

The fundamental metamer for each pixel, $N^*$, is calculated by $$N^* = EQ \quad (12)$$

where Q is the 3×1 matrix of the pixel's CIE XYZ color values. E is a matrix calculated by $$E = AM^{-1} \quad (13)$$

where A is a matrix with the three color mixture functions that are defined in the CIE 1931 standard. Typically, a value would be used for every 10 nm in the visible region from 300 to 700 nm. The result is 31 values for each of the three color mixture functions. A, therefore, is typically a 31×3 matrix. $M^{-1}$ was defined by Cohen and Kappauf as $(A'A)^{-1}$, where $A'$ is the matrix transpose of A, and $(A'A)^{-1}$ is the matrix inverse of the matrix multiplication product of $A'$ and A.

It is important to note that there is one unique fundamental metamer, $N^*$, for each given set of CIE XYZ values, and for each pixel in an image.

A black metamer, J, for each pixel is calculated according to the Cohen and Kappauf by $$J = N - N^* \quad (14)$$

where N is a radiometric function. N is also referred to in the art as the power spectrum, radiometric function, or simply as the visible spectrum of a particular color represented by a set of red, green, and blue values.

There are an infinite number of radiometric functions that would result in any given set of CIE XYZ values. Consequently, according to (14) there also is an infinite number of black metamers that would correspond to any given set of CIE XYZ values. Further, since every set of three red, green, and blue values for a pixel in an image can be converted to a point in CIE XYZ color space, there will be an infinite number of black metamers and radiometric functions possible for each pixel in an image.

If a radiometric function, N, is assumed for a given set of CIE XYZ values, one unique black metamer can be calculated for a given set of CIE XYZ values, or further for a given pixel in an image. Similarly, if a black metamer, J, is assumed for a given set of CIE XYZ values, one unique radiometric function can be calculated for a given set of CIE XYZ values and thus for a given set of red, green, and blue pixel values. The radiometric function of black metamer would, for instance, be determined in Step 106 of FIG. 1.

In one embodiment of this invention, a pixel's red, green, and blue values are converted to its respective CIE XYZ values after which the respective fundamental metamer, a component black metamer, and a component radiometric function are calculated. The metamers and radiometric function are preferably stored in the computer memory as floating point binary numbers. Preferably, 31 points are used to represent the visible spectrum, so there will be 31 floating point numbers for each of the metamers and the radiometric function. Any one or any combination of the floating point numbers of the metamers and the radiometric function, referred to as the radiometric expression, is used in the cryptographic system. The floating point numbers in binary can be concatenated together to form a large precision integer. It will be recognized that the floating point numbers can be concatenated to form sequences of any length. In one embodiment, a floating point or high precision integer from the radiometric expression would be used as the x value in the calculation of the base point in Step 102 of FIG. 1. This allows the base point is be calculated for each block of data in Step 106, rather than once for the entire set of data in Step 102. A more secure cryptographic system results. If a third party intercepts and pirates a base point, they have access to only one block of data rather than the entire set of data. In addition, the metamers and radiometric function are calculated from the data itself allowing no extra information to transmit from the sender to the receiver for the data to be decrypted. Again, a more secure cryptographic system results.

The preferred embodiment is where any one or combination of the floating point numbers of the radiometric expression are mathematically combined with the data blocks. The binary form of the radiometric expression, called the bitwise expression is, for instance, added or multiplied with the data block. The embodiment that is more preferred is combining the bitwise expression with the data blocks with an exclusive-or mathematical operation, common in the field of computer science. This would be an additional process performed in Step 106 in FIG. 1. After the exclusive-or mathematical operation between the radiometric expression and the block of data, the data would be further encrypted as described above in reference to FIG. 1. The result is that the data is encrypted in a more complex fashion, and would be more difficult to pirate and decrypt without authorization. The advantage is that the exclusive-or operation is extremely fast computationally, and very little loss of computational efficiency would be expected.

The most preferred embodiment for the invention is the combination of cyclotomic polynomials as the equation for encrypting the data and the exclusive-or mathematical operation between the radiometric expression and each block of data.

One advantage in the use of metameric components and the radiometric function is that, they are derived from the image data itself instead of being derived independently. Any modifications, whether intentional or by chance, to the encrypted images, the state in which the images are most susceptible to piracy, will cause the information carried by the metameric components to change. This results in a failed decryption of the images in attempts at piracy. In this way, the use of metameric components results in a more secure cryptographic system for digital images. In addition, there is less communication that is necessary between the sender and receiver.

Another advantage in the use of metameric components is that a very small block of image data leads to a large amount of information useful in the cryptographic system. The three red, green, and blue color components of one pixel leads to metameric components and radiometric functions, each of which preferably has 31 floating point values. If it is assumed that each floating point value is 32 bits in computer memory, each metameric component and radiometric function results in a block of 31×32=992 bits.

The examples presented in this document are for exemplary purposes not meant to limit the scope of the invention. Practitioners of the art will appreciate that the invention may be applied easily to images compressed by any technique, as well as to uncompressed images, and to images that have been enhanced through techniques well known in image science, such as gamma correction, color correction, noise removal, and sharpening. In addition, it will be appreciated that the invention may be applied easily to image data that has been modified with techniques known in the cryptographic art to increase security such as expansion permutations, straight permutations, and substitution boxes. Extensions of this invention to any cryptographic application, in particular those involving images, will be obvious to practitioners of the art.

EXAMPLE 1

An 8 bit pixel value, 125, from a monochrome image will be encrypted using an elliptical curve according to that taught in the current art. The encrypted pixel value will be sent from the Sender to the Receiver, and it will be decrypted by the Receiver.

The rules for the addition and multiplication of points on elliptical curves, which are used in this example, are well known in the art and are described in such textbooks as *Implementing Elliptical Curve Cryptography* by Michael Rosing (Manning Publications, 1999, pages 109–122).

Referring to Step 102 in FIG. 1, the elliptical equation coefficients, base point B, and point $P_r$ are calculated.

The coefficients for equation (1) are chosen as $K_1=1$ and $K_2=1$, resulting in the following elliptical curve equation:

$$y^2+xy=x^3+x^2+1 \qquad (15)$$

The base point B is chosen by picking a random number as the x value in equation (15) and evaluating for y. The value of x is chosen as 21, and equation (15) reduces to the following quadratic equation:

$$y^2+21y-9703=0 \qquad (16)$$

Out of the two values for y, 88.5618 and −109.5618, which are obtained upon solving equation (16), 88.5618 is chosen. Hence, the base point B is (21, 88.5618).

The Receiver generates a random number ($k_r=4$) and multiplies it with the base point B to give point $P_r$ as shown in Equation (3).

$$P_r=4*(21, 88.5618)=(0.90943, 1.21155).$$

The Receiver sends $P_r$ to the Sender.

Referring to Step 104 in FIG. 1, the data to be encrypted is partitioned into blocks. The pixel value, 125, is considered a block of data for this example.

Referring to Step 106 in FIG. 1, the Sender will calculate two points, $P_1$ and $P_2$.

A random number, q=5, is generated and multiplied with the base point B according to equation (4) to give point $P_1$.

$$P_1=5*(21, 88.5618)=(0.341986, 0.913663).$$

Before $P_2$ is calculated, the pixel value, 125, must be converted to a point on the elliptical curve. The value of x in equation (15) is set to 125, and the equation reduces to the following quadratic equation:

$$y^2+125y-1,968,751=0 \qquad (17)$$

Out of the two values for y, 1342.0000 and −1467.0000, which are obtained upon solving equation (17), 1342.0000 is chosen. Hence, the encrypted pixel value point, $P_m$, is (125, 1342).

$P_2$ is calculated according to equation (5).

$$P_2=(125, 1342)+(5*(0.90943, 1.21155))=(138.33129, 1565.128804)$$

Referring to Step 108 in FIG. 1, the Sender sends $P_1$ and $P_2$ to the Receiver.

Referring to Step 110 in FIG. 1, the Receiver calculates points, $P_3$ and $P_4$. The calculation of these points is known in the art as applying the inverse of the encrypting transform. $P_3$ is calculated by multiplying $k_r$ and $P_1$ according to equation (6).

$$P_3=4*(0.341986, 0.913663)=(49,140.29681, -10,917, 938.43)$$

$P_4$ is calculated by subtracting $P_3$ from $P_2$ according to equation (7).

$$P_4=(138.33129,1565.128804)-(49,140.29681, -10,917,938.43)=(125, 1337)$$

Referring to Step 112 in FIG. 1, the unencrypted pixel value is taken as the x value of the point $P_4$. In this example, the pixel value, 125, has been correctly encrypted and decrypted.

EXAMPLE 2

An 8 bit pixel with red, green, and blue (RGB) values of 35, 125, and 26 from a color image will be encrypted using an elliptical curve according to that taught in the current art. The encrypted pixel value will be sent from the Sender to the Receiver, and it will be decrypted by the Receiver. The RGB values of the color pixel will each be treated as if they were separate monochrome pixel values, and the calculations are done as described in Example 1.

Referring to Step 102 in FIG. 1, the coefficients for the elliptical curve are $K_1=1$ and $K_2=1$, the base point B is (21, 88.5618), and point $P_r$ is (0.90943, 1.21155), all as in Example 1.

Referring to Step 104 in FIG. 1, the data to be encrypted is partitioned into blocks. The RGB pixel values, 35, 125, and 26 are considered as three separate blocks of data for this example.

Referring to Step 106 in FIG. 1, the Sender will calculate the $P_1$ and $P_2$ points. Point $P_1$ is the same for all the RGB pixel values, and is (0.341986, 0.913663) as in Example 1.

There are three $P_2$ points, one for each of the RGB pixel values. Before the $P_2$ points are calculated, the RGB pixel values, 35, 125, and 26 are separately converted to points as in Example 1. Thus, $P_{mR}=(35, 193.2302778)$, $P_{mG}=(125, 1342)$, and $P_{mB}=(26, 122.7276685)$, respectively on the elliptical curve. The three $P_2$ points that correspond to the RGB pixel values are calculated according to equation (5).

$$P_{2R}=(35,193.2302778)+(5*(0.90943, 1.21155))=(36.92907424, 209.7163823)$$

$$P_{2G}=(125,1342)+(5*(0.90943, 1.21155))=(138.33129, 1565.128804)$$

$$P_{2B}=(26,122.7276685)+(5*(0.90943, 1.21155))=(27.23565155, 131.7444508)$$

Referring to Step 108 in FIG. 1, the Sender sends $P_1$ and the three $P_2$ points to the Receiver.

Referring to Step 110 in FIG. 1, the Receiver calculates the $P_3$ and $P_4$ points. The calculation of these points is known in the art as applying the inverse of the encrypting transform. $P_3$ is the same for all the RGB pixel values, and is (49, 140.29681, −10,917,938.43) as in Example 1.

There are three $P_4$ points, one for each of the RGB pixel values. The $P_4$ points are calculated by subtracting $P_3$ from each of the $P_2$ points according to equation (7), which results in $P_{4R}$=(36.92907424, 209.7163823)−(49,140.29681, −10,917,938.43)=(35, 193.2302778)

$P_{4G}$=(138.33129, 1565.128804)−(49,140.29681, −10,917,938.43)=(125, 1337)

$P_{4B}$=(27.23565155, 131.7444508)−(49,140.29681, −10,917,938.43)=(26.23565155, 131.7444508)

Referring to Step 112 in FIG. 1, the unencrypted RGB pixel values are taken as the x values of the three $P_4$ points. In this example, the red, green, and blue pixel values, 35, 125, and 26, respectively, have been correctly encrypted and decrypted.

EXAMPLE 3

An 8 bit pixel value, 125, from a monochrome image will be encrypted using a cyclotomic curve according to an embodiment of the invention. The encrypted pixel value will be sent from the Sender to the Receiver, and it will be decrypted by the Receiver.

Referring to Step 102 in FIG. 1, the coefficients and the roots of the cyclotomic polynomial, base point B, and point $P_r$ are calculated.

The cyclotomic polynomial is generated from equation (10) with d=17. Since the number, 17, is prime, the cyclotomic polynomial is generated with equation (11) resulting in $x^{16}+x^{15}+x^{14}+x^{13}+x^{12}+x^{11}+x^{10}+x^9+x^8+x^7+x^6+x^5+x^4+x^3+x^2+x+1=0$ (18)

Figure 2:
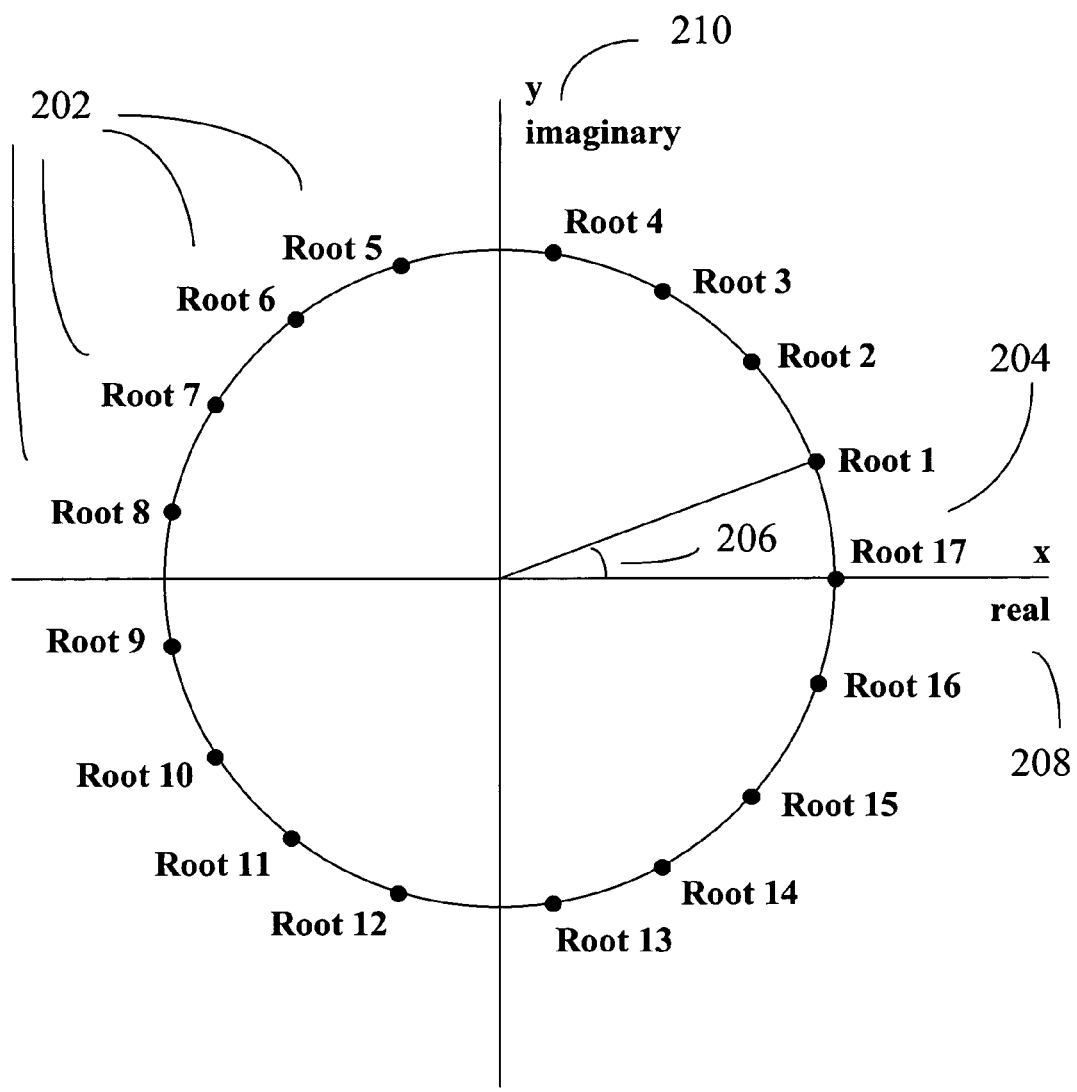
FIG. 2 is a graph illustrating the determination of the roots for a cyclotomic polynomial of order 17.

There are 16 roots for equation (18). As taught in mathematical textbooks, such as *A First Course in Abstract Algebra* by Joseph Rotman (Prentice-Hall Inc. 1996), the roots are all complex numbers and are points on the unit circle on the complex plane. The complex plane is normally depicted as a two dimensional plot where the x-axis represents the real part of a complex number, and the y-axis represents the imaginary part of a complex number. The unit circle on the complex plane is referred to as the cyclotomic curve. According to Rotman, the points for the roots, plus one more point corresponding to the real number, 1, are equidistant on the cyclotomic curve as shown in FIG. 2. To identify the points (202), first the real number, 1 (204), is located on the cyclotomic curve. The real axis (208) and the imaginary axis (210) are also shown. The points for the roots are identified by dividing 360 degrees by 17 to give 21.176 degrees. Each point representing a root to equation 18 is a multiple of 21.176 degrees from the real number, 1. In FIG. 2, 206 shows the angle of the first point, which is 1×21.176= 21.176 degrees. Table 1 lists the 16 roots plus the real number, 1, and the corresponding angle from the real number, 1.

The base point, B, is chosen by first picking a random number from 1 to 17 and using the point that corresponds to that same number root on the cyclotomic curve. The random number is 7, and the base point B is therefore root 7.

The Receiver generates a random number ($k_r$=4) and multiplies it with the base point B to give point $P_r$ as shown in Equation (3). The multiplication of any point on the cyclotomic curve with a constant is done by either multi-plying the corresponding angle of the point in the complex plane by the constant modulus 360, or by multiplying the root number by the constant modulus 17. With the latter method, the base point B is root 7 on the cyclotomic curve, and multiplying by 4 modulus 17 gives root 11.

$$P_r = 4 * \left(-0.850217133 + 0.526432167\, i\right)_{Root\ 7}$$

$$= \left(-0.602634642_{Root\ 11} - 0.798017222\, i\right)$$

Point $P_r$ is root 11 on the cyclotomic curve.

Referring to Step 104 in FIG. 1, the data to be encrypted is partitioned into data blocks. The pixel value, 125, is represented in hexadecimal form as 7d, and is partitioned into 2 blocks. One block is 7, and the other is d.

Referring to Step 106 in FIG. 1, the Sender will calculate two points, $P_1$ and $P_2$.

A random number, q=5, is generated and multiplied with the base point B according to equation (4) to give point $P_1$. The base point B is root 7 on the cyclotomic curve, and multiplying by 5 modulus 17 gives root 1.

$$P_1 = 5*(-0.850217133 + 0.526432167i)_{Root\ 7}$$

$$= (0.93247229 + 0.361241665i)_{Root\ 1}$$

Point $P_1$ is therefore root 1 on the cyclotomic curve.

Before $P_2$ is calculated, the data blocks derived from the pixel value, 125 (7d in hexadecimal form) must be converted to points on the cyclotomic curve. For each block of data, the hexadecimal number is converted to the base 10 number, and is mapped to that same number root on the cyclotomic curve. The first block of data is 7 in hexadecimal form, 7 in base 10, and therefore, maps to root 7 on the cyclotomic curve. The second block of data is d in hexadecimal form, 13 in base 10 form, and therefore maps to root 13 on the cyclotomic curve. A different $P_2$ value is calculated for each block according to Equation (5). The $P_2$ value for the first block evaluates as $$P_{2block\ 1} = (-0.850217133 + 0.526432167i)_{Root\ 7} +$$
$$(5*(-0.602634642 - 0.798017222i))_{Root\ 11}$$
$$= (-0.602634642 - 0.798017222i)_{Root\ 11}$$

The $P_2$ value for the second block evaluates as $$P_{2block\ 2} = (0.09226835 - 0.995734177i)_{Root\ 13} +$$
$$(5*(-0.602634642 - 0.798017222i))_{Root\ 11}$$
$$= (1 + 0i)_{Root\ 17}$$

Referring to Step 108 in FIG. 1, the Sender sends the $P_1$ and $P_2$ points as the complex numbers to the Receiver.

Referring to Step 110 in FIG. 1, the Receiver calculates the $P_3$ and $P_4$ points. The calculation of these points is known in the art as applying the inverse of the encrypting transform. $P_3$ is calculated by multiplying $k_r$ and $P_1$ according to equation (6), which results in $$P_3 = 4 * \underbrace{(0.93247229 + 0.361241665i)}_{Root\ 1}$$
$$= \underbrace{(0.092268362 + 0.995734176i)}_{Root\ 4}$$

$P_4$ is calculated by subtracting $P_3$ from each $P_2$ value according to equation (7).

$$P_{4block\ 1} = \underbrace{(-0.602634642 - 0.798017222i)}_{Root\ 11} -$$
$$\underbrace{(0.092268362 + 0.995734176i)}_{Root\ 4}$$
$$= \underbrace{(-0.850217133 + 0.526432167i)}_{Root\ 7}$$

for the first block of data, and $$P_{4block\ 2} = (1 + 0i) - \underbrace{(0.092268362 + 0.995734176i)}_{Root\ 4}$$
$$= \underbrace{(0.09226835 - 0.995734177i)}_{Root\ 13}$$

for the second block of data.

Referring to Step 112 in FIG. 1, the unencrypted pixel value is taken as the combination of the two $P_4$ values. In this example, first $P_4$ value is root 7, and the second $P_4$ value is root 13, which represent hexadecimal numbers 7 and d. When combined, 7d represents 125 in base 10 form. In this example, the pixel value, 125, has been correctly encrypted and decrypted.

EXAMPLE 4

An 8 bit pixel with red, green, and blue values of 35, 125, and 26 from a color image will be encrypted using a cyclotomic curve according to an embodiment of the invention. The encrypted pixel values will be sent from the Sender to the Receiver, and they will be decrypted by the Receiver. The RGB values of the color pixel will each be treated as if they were separate monochrome pixel values, and the calculations are done as described in Example 3.

Referring to Step 102 in FIG. 1, the coefficients and the roots of the cyclotomic polynomial, base point B, and point $P_r$ are calculated. Equation 18 is the cyclotomic polynomial that is used. The cyclotomic curve and the roots are the same as in Example 3. They are listed in Table 1 and depicted in FIG. 2. Also, the base point B is root 7 and the point $P_r$ is root 11 on the cyclotomic curve as in Example 3.

Referring to Step 104 in FIG. 1, the data to be encrypted is partitioned into blocks. The three RGB pixel values, 35, 125, and 26 are represented in hexadecimal form as 23, 7d, and 1a, respectively. The hexadecimal form of each RGB value further is partitioned into 2 blocks of data as shown in the table below.

|  | Base 10 | Hexadecimal | Block 1 | Block 2 |
|---|---|---|---|---|
| Red Pixel Value | 35 | 23 | 2 | 3 |
| Green Pixel Value | 125 | 7d | 7 | d |
| Blue Pixel Value | 26 | 1a | 1 | a |

Referring to Step 106 in FIG. 1, the Sender will calculate points, $P_1$ and $P_2$. Point $P_1$ is the same for all the RGB pixel values, and is calculated as root 1 on the cyclotomic curve as in Example 3.

Before the $P_2$ points are calculated, data blocks derived from the RGB pixel values, 35, 125, and 26 (23, 7d, and 1a in hexadecimal, respectively) are converted to points on the cyclotomic curve. For each block of data, the hexadecimal number is converted to the base 10 number, and is mapped to that same number root on the cyclotomic curve. The mapping for the six data blocks are shown in the table below.

|  | Data Block | Root Number on Cyclotomic Curve |
|---|---|---|
| Red Pixel Value | 2 | 2 |
|  | 3 | 3 |
| Green Pixel Value | 7 | 7 |
|  | d | 13 |
| Blue Pixel Value | 1 | 1 |
|  | a | 10 |

A different $P_2$ value is calculated for each block according to Equation (5).

$$P_{2R\ block\ 1} = \underbrace{(0.739008918 + 0.673695642i)}_{Root\ 2} +$$
$$(5 * \underbrace{(-0.602634642 - 0.798017222i)}_{Root\ 11})$$
$$= \underbrace{(-0.602634632 + 0.798017229i)}_{Root\ 6}$$

$$P_{2R\ block\ 2} = \underbrace{(0.445738357 + 0.89516329i)}_{Root\ 3} +$$
$$(5 * \underbrace{(-0.602634642 - 0.798017222i)}_{Root\ 11})$$
$$= \underbrace{(-0.850217133 + 0.526432167i)}_{Root\ 7}$$

$$P_{2G\ block\ 1} = \underbrace{(0.850217133 + 0.526432167i)}_{Root\ 7} +$$
$$(5 * \underbrace{(-0.602634642 - 0.798017222i)}_{Root\ 11})$$
$$= \underbrace{(-0.602634642 + 0.798017222i)}_{Root\ 11}$$

$$P_{2G\ block\ 1} = \underbrace{(0.09226835 - 0.995734177i)}_{Root\ 13} +$$
$$(5 * \underbrace{(-0.602634642 - 0.798017222i)}_{Root\ 11})$$
$$= \underbrace{(1 + 0i)}_{Root\ 17}$$

$$P_{2B\ block\ 1} = \underbrace{(0.93247229 + 0.361241665i)}_{Root\ 1} +$$
$$(5 * \underbrace{(-0.602634642 - 0.798017222i)}_{Root\ 11})$$
$$= \underbrace{(-0.273662986 + 0.961825644i)}_{Root\ 5}$$

-continued $$P_{2B\ block\ 2} = \underset{Root\ 10}{(-0.850217139 - 0.526432156i)} +$$
$$\underset{Root\ 11}{(5 * (-0.602634642 - 0.798017222i))}$$
$$= \underset{Root\ 14}{(0.445738346 - 0.895163295i)}$$

Referring to Step 108 in FIG. 1, the Sender sends the $P_1$ and $P_2$ points as the complex numbers to the Receiver.

Referring to Step 110 in FIG. 1, the Receiver calculates $P_3$ and $P_4$ points. The calculation of these points is known in the art as applying the inverse of the encrypting transform. $P_3$ is the same for all the RGB pixel values, and is root 4 as in Example 3.

There are six $P_4$ points, one for each data block. The $P_4$ points are calculated by subtracting $P_3$ from each of the $P_2$ points according to equation (7).

$$P_{4R\ block\ 1} = \underset{Root\ 6}{(-0.602634632 + 0.798017229i)} -$$
$$\underset{Root\ 4}{(0.092268362 + 0.995734176i)}$$
$$= \underset{Root\ 2}{(0.739008918 + 0.673695642i)}$$

$$P_{4R\ block\ 2} = \underset{Root\ 7}{(-0.850217133 + 0.526432167i)} -$$
$$\underset{Root\ 4}{(0.092268362 + 0.0995734176i)}$$
$$= \underset{Root\ 3}{(0.445738357 + 0.89516329i)}$$

$$P_{4G\ block\ 1} = \underset{Root\ 11}{(-0.602634642 - 0.798017222i)} -$$
$$\underset{Root\ 4}{(0.092268362 + 0.995734176i)}$$
$$= \underset{Root\ 7}{(-0.850217133 + 0.526432167i)}$$

$$P_{4G\ block\ 2} = \underset{Root\ 17}{(1 + 0i)} - \underset{Root\ 4}{(0.092268362 + 0.995734176i)}$$
$$= \underset{Root\ 13}{(0.09226835 - 0.995734177i)}$$

$$P_{4B\ block\ 1} = \underset{Root\ 5}{(-0.273662986 + 0.961825644i)} -$$
$$\underset{Root\ 4}{(0.092268362 + 0.995734176i)}$$
$$= \underset{Root\ 1}{(0.93247229 + 0.361241665i)}$$

$$P_{4B\ block\ 2} = \underset{Root\ 14}{(0.445738346 - 0.895163295i)} -$$
$$\underset{Root\ 4}{(0.092268362 + 0.995734176i)}$$
$$= \underset{Root\ 10}{(-0.850217139 - 0.526432156i)}$$

Referring to Step 112 in FIG. 1, the unencrypted RGB pixel values are taken as the combination of the two respective $P_4$ values. For the red pixel value, first $P_4$ value is root 2, and the second $P_4$ value is root 3, which when combined represent 23 in hexadecimal form or 35 in base 10 form. For the green pixel value, first $P_4$ value is root 7, and the second $P_4$ value is root 13, which when combined represent 7d in hexadecimal form or 125 in base 10 form. For the blue pixel value, first $P_4$ value is root 1, and the second $P_4$ value is root 10, which when combined represent 1a in hexadecimal form or 26 in base 10 form. Therefore, the unencrypted RGB pixel values are 35, 125, and 26, respectively. In this example, the red, green, and blue pixel values, 35, 125, and 26, respectively, have been correctly encrypted and decrypted.

EXAMPLE 5

A black metamer is calculated from an 8 bit pixel with red, green, and blue (RGB) values of 35, 125, and 26 from a color image. The RGB values are according to the standard known in the field of color science as Rec.709. The black metamer is used in one embodiment to choose a base point B as used in Examples 1–4, or in another embodiment, to combine with a data block in an encryption scheme to more securely encrypt it.

The RGB pixel values are converted to CIE XYZ values by matrix multiplication according to a technique well known in the art and described in color science textbooks such as *A Technical Introduction to Digital Video*, by Charles Poynton (Wiley & Sons, 1996, pages 147–148). The RGB pixel values are divided by 255 to put them in a range from 0 to 1. They are treated as a 3×1 matrix and multiplied by a specific, standardized 3×3 matrix given by Poynton to convert them to CIE XYZ color values. The matrix multiplication to yield the CIE XYZ values is shown in Equation 19.

$$\begin{bmatrix} X \\ Y \\ Z \end{bmatrix} = \begin{bmatrix} 0.412453 & 0.357580 & 0.180423 \\ 0.212671 & 0.715160 & 0.072169 \\ 0.019334 & 0.119193 & 0.950227 \end{bmatrix} \cdot \begin{bmatrix} 35/255 \\ 125/255 \\ 26/255 \end{bmatrix} \quad (19)$$

The X, Y, and Z values are 0.250291, 0.387118, 0.157967, respectively.

The CIE XYZ values are further converted to the corresponding fundamental metamer by Equation 12 and as described in a technical paper by Jozef B. Cohen and William E. Kappauf entitled, *Color Mixture and Fundamental Metamers: Theory, Algebra, Geometry, Application* (*American Journal of Psychology* 98, 171–259, 1985). The fundamental metamer is a continuous function of wavelength in the range of 400 to 700 nanometers, which is the visible range of the electromagnetic spectrum. It is represented with 31 values, one for every 10 nanometer increments from 400 to 700 nanometers. The 3×1 matrix of the CIE XYZ values is used as the matrix Q in equation 12. The matrix E in equation 12 is calculated from the three color mixture functions that are defined in the CIE 1931 standard as shown in equation 13. The matrix A in equation 12 is composed of the three standard CIE color mixture functions, and are reproduced from Poynton's book in Table 2. The $M^{-1}$ matrix in equation 13 is calculated by multiplying the A matrix with its transpose and calculating the inverse. The matrix E, which results from the matrix multiplication of A and $M^{-1}$ is shown in Table 2.

Figure 3:
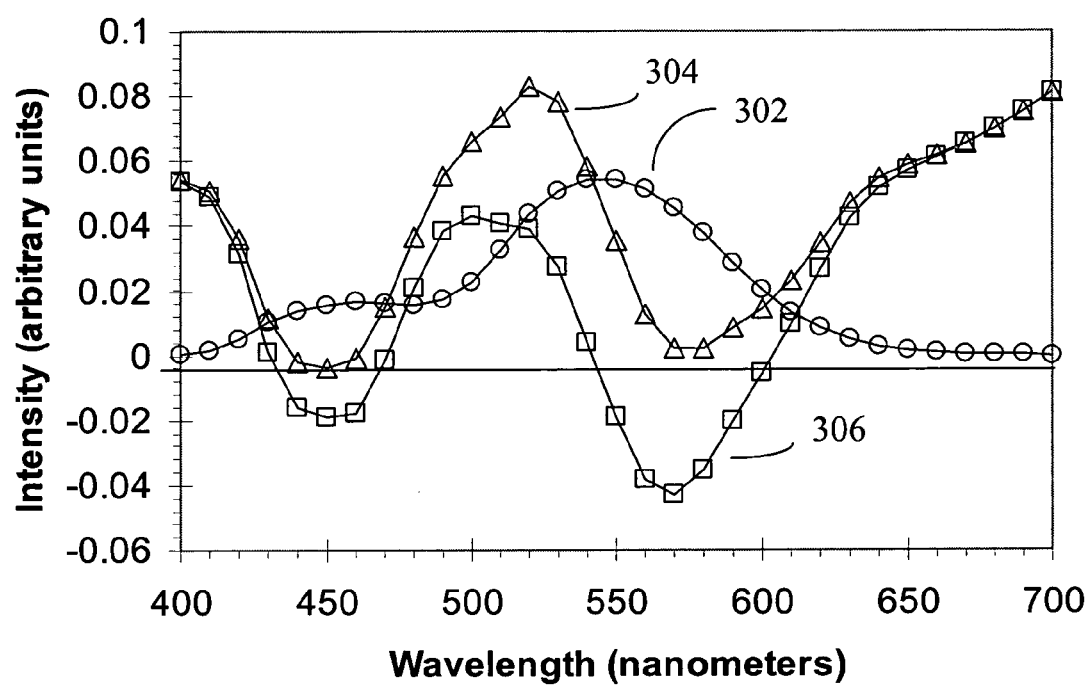
FIG. 3 is a graph illustrating the plots of two metameric components referred to as a fundamental metamer and a black metamer, and of a radiometric function.

The fundamental metamer is calculated by multiplying the 3×1 CIE XYZ matrix with matrix E according to equation 12. The fundamental metamer is shown as 302 in FIG. 3, and the discrete values are listed in Table 3.

A radiometric function is randomly chosen and a black metamer calculated by subtracting the fundamental metamer from the radiometric metamer according to equation 14. The subtraction occurs by subtracting the value at each wavelength for the fundamental metamer from the respective value for the radiometric metamer. The radiometric function that was chosen for this example along with the black metamer that was calculated are shown as 304 and 306 in FIG. 3, and their discrete values are listed in Table 3.

The bitwise representation of the first floating point number of the black metamer is chosen as the radiometric expression that will be used in this example. The first floating point number in the black metamer is 0.05077624, which is expressed in binary arithmetic as 0.00001101. This binary number without the decimal (00001101) will be referred to as the "black metamer bitwise expression." It converts to the base 10 integer number, 13.

The black metamer bitwise expression can be used to choose the base point B in one embodiment of the invention. In this embodiment, Example 1 would be repeated using 13 as the x value when determining the base point, B, yielding (13, 42.584). Also, Example 3 would be repeated using the value 13 to map to root 13 on the cyclotomic curve and using that point as the base point B.

In another embodiment, the black metamer bitwise expression can also be combined with the data blocks in Examples 1–4 with an exclusive-or operation. This embodiment is demonstrated in the next example.

EXAMPLE 6

Example 2 will be repeated except that the data blocks that are encrypted are combined with the black metamer bitwise expression derived from the black metamer in Example 5. The Receiver must separate the black metamer bitwise expression from the decrypted data blocks to obtain the unencrypted pixel values.

Referring to Step 102 in FIG. 1, the coefficients for the elliptical curve are $K_1=1$ and $K_2=1$, the base point B is (21, 88.5618), and point $P_r$ is (0.90943, 1.21155), all as in Example 1.

Referring to Step 104 in FIG. 1, the data to be encrypted is partitioned into blocks and combined with the black metamer bitwise expression. The RGB pixel values, 35, 125, and 26 are considered as three separate blocks of data for this example. Each of the three RGB pixel values is converted to binary numbers and is combined with the black metamer bitwise expression with an exclusive-or mathematical operation. The red pixel value, 35, converts to the binary value, 0010 0011, the green pixel value, 125, converts to the binary value, 0111 1101, and the blue pixel value converts to the binary value, 0001 1010. The exclusive-or operations are common in the field of computer science and are shown in the following tables applied to these pixel values.

| | | | | | | | | |
|---|---|---|---|---|---|---|---|---|
| Red pixel value | 0 | 0 | 1 | 0 | 0 | 0 | 1 | 1 |
| Black metamer bitwise expression | 0 | 0 | 0 | 0 | 1 | 1 | 0 | 1 |
| Exclusive-or operation | 0 | 0 | 1 | 0 | 1 | 1 | 1 | 0 |
| Green pixel value | 0 | 1 | 1 | 1 | 1 | 1 | 0 | 1 |
| Black metamer bitwise expression | 0 | 0 | 0 | 0 | 1 | 1 | 0 | 1 |
| Exclusive-or operation | 0 | 1 | 1 | 1 | 0 | 0 | 0 | 0 |
| Blue pixel value | 0 | 0 | 0 | 1 | 1 | 0 | 1 | 0 |
| Black metamer bitwise expression | 0 | 0 | 0 | 0 | 1 | 1 | 0 | 1 |
| Exclusive-or operation | 0 | 0 | 0 | 1 | 0 | 1 | 1 | 1 |

The binary numbers that result from the exclusive-or mathematical operations are converted to base 10 values. The binary value for the red pixel value, 0010 1110, converts to 46, the binary value for the green pixel value, 0111 000, converts to 112, and the binary value for the red pixel, 0001 0111, converts to 23. The values, 46, 112, and 23 are considered three separate blocks of data for this example.

Referring to Step 106 in FIG. 1, the Sender will calculate the $P_1$ and $P_2$ points. Point $P_1$ is the same for all the RGB pixel values, and is (0.341986, 0.913663) as in Example 1.

Before the $P_2$ points are calculated, the values, 46, 112, and 23 are separately converted to points, $P_{mR}$=(46, 293.1993042), $P_{mG}$=(112, 1135.893032), and $P_{mB}$=(23, 101.7662792), respectively on the elliptical curve. The three $P_2$ points that correspond to these values are calculated according to equation (5).

$P_{2R}$=(46,293.1993042)+(5*(0.90943, 1.21155))=(48.9116306, 321.9585303).

$P_{2G}$=(112,1135.893032)+(5*(0.90943, 1.21155))=(123.2662196, 1313.85295).

$P_{2B}$=(23,101.7662792)+(5*(0.90943, 1.21155))=(24.0290666, 108.800493).

Referring to Step 108 in FIG. 1, the Sender sends $P_1$ and the three $P_2$ points to the Receiver.

Referring to Step 110 in FIG. 1, the Receiver calculates the $P_3$ and $P_4$ points. The calculation of these points is known in the art as applying the inverse of the encrypting transform. $P_3$ is the same for all the RGB pixel values, and is (49, 140.29681, −10,917,938.43) as in Example 1.

There are three $P_4$ points, one for each of the RGB pixel values. The $P_4$ points are calculated by subtracting $P_3$ from each of the $P_2$ points according to equation (7).

$P_{4R}$=(48.9116306, 321.9585303)−(49,140.29681, −10, 917,938.43)= (45.9287, 292.509).

$P_{4G}$=(123.2662196,1313.852957)−(49,140.29681, −10,917,938.43)= (111.7314, 1131.761).

$P_{4B}$=(24.0290666, 108.800493)−(49,140.29681, −10, 917,938.43)= (22.9744, 101.5956).

Referring to Step 112 in FIG. 1, the x values of the three $P_4$ points are converted to binary numbers and are separated from the black metamer bitwise expression through an exclusive-or mathematical operation. The red x value, 46, is converted to the binary number, 0010 1110, the green x value, 112, is converted to the binary number, 0111 0000, and the blue x value, 23, is converted to the binary number, 0001 0111. The exclusive-or operations are shown in the tables below.

| | | | | | | | | |
|---|---|---|---|---|---|---|---|---|
| Red value | 0 | 0 | 1 | 0 | 1 | 1 | 1 | 0 |
| Black metamer bitwise expression | 0 | 0 | 0 | 0 | 1 | 1 | 0 | 1 |
| Exclusive-or operation | 0 | 0 | 1 | 0 | 0 | 0 | 1 | 1 |
| Green value | 0 | 1 | 1 | 1 | 0 | 0 | 0 | 0 |
| Black metamer bitwise expression | 0 | 0 | 0 | 0 | 1 | 1 | 0 | 1 |
| Exclusive-or operation | 0 | 1 | 1 | 1 | 1 | 1 | 0 | 1 |
| Blue value | 0 | 0 | 0 | 1 | 0 | 1 | 1 | 1 |
| Black metamer bitwise expression | 0 | 0 | 0 | 0 | 1 | 1 | 0 | 1 |
| Exclusive-or operation | 0 | 0 | 0 | 1 | 1 | 0 | 1 | 0 |

The binary numbers that result from the exclusive-or operations are converted to base 10 values, and are taken as the unencrypted RGB pixel values. The binary value for the red pixel, 0010 0011, converts to 35, the binary value for the green pixel, 0111 1101, converts to 125, and the binary value for the blue pixel, 0001 1010, converts to 26. The unencrypted RGB pixel values are 35, 125, and 26, respectively. In this example, the red, green, and blue pixel values, 35, 125, and 26, respectively, have been correctly encrypted and decrypted.

The invention has been described with reference to one or more preferred embodiments. However, it will be appreciated that variations and modifications can be effected by persons of ordinary skill in the art without departing from the scope of the invention.

TABLE 1

| Root Number | Root (Complex Number) | Angle of the Root Point (degrees) |
|---|---|---|
| 1 | 0.93247229 + 0.361241665i | 21.176 |
| 2 | 0.739008918 + 0.673695642i | 42.352 |
| 3 | 0.445738357 + 0.89516329i | 63.528 |
| 4 | 0.092268362 + 0.995734176i | 84.704 |
| 5 | −0.273662986 + 0.961825644i | 105.88 |
| 6 | −0.602634632 + 0.798017229i | 127.056 |
| 7 | −0.850217133 + 0.526432167i | 148.232 |
| 8 | −0.982973098 + 0.183749523i | 169.408 |
| 9 | −0.9829731 − 0.183749511i | 190.584 |
| 10 | −0.850217139 − 0.526432156i | 211.76 |
| 11 | −0.602634642 − 0.798017222i | 232.936 |
| 12 | −0.273662998 − 0.96182564i | 254.112 |
| 13 | 0.09226835 − 0.995734177i | 275.288 |
| 14 | 0.445738346 − 0.895163295i | 296.464 |
| 15 | 0.73900891 − 0.673695651i | 317.64 |
| 16 | 0.932472225 − 0.361241676i | 338.816 |
| 17 | 1 | 360 |

TABLE 2

| A Matrix | | | E Matrix | | |
|---|---|---|---|---|---|
| 0.0143 | 0.0004 | 0.0679 | 0.001655 | −0.00167 | 0.004647 |
| 0.0435 | 0.0012 | 0.2074 | 0.004996 | −0.00507 | 0.014204 |
| 0.1344 | 0.004 | 0.6456 | 0.015119 | −0.01545 | 0.044273 |
| 0.2839 | 0.0116 | 1.3856 | 0.030021 | −0.03102 | 0.095332 |
| 0.3483 | 0.023 | 1.7471 | 0.032185 | −0.03395 | 0.120925 |
| 0.3362 | 0.038 | 1.7721 | 0.022662 | −0.02535 | 0.129927 |
| 0.2908 | 0.060 | 1.6692 | 0.005709 | −0.00948 | 0.118711 |
| 0.1954 | 0.091 | 1.2876 | −0.01766 | 0.014366 | 0.094284 |
| 0.0956 | 0.139 | 0.813 | −0.04236 | 0.042129 | 0.063222 |
| 0.0320 | 0.208 | 0.4652 | −0.0658 | 0.070719 | 0.040933 |
| 0.0049 | 0.323 | 0.272 | −0.09575 | 0.108765 | 0.030298 |
| 0.0093 | 0.503 | 0.1582 | −0.13519 | 0.16147 | 0.026173 |
| 0.0633 | 0.71 | 0.0782 | −0.16541 | 0.210806 | 0.022983 |
| 0.1655 | 0.862 | 0.0422 | −0.16614 | 0.231433 | 0.019294 |
| 0.2904 | 0.954 | 0.0203 | −0.14379 | 0.227545 | 0.013888 |
| 0.4334 | 0.995 | 0.0087 | −0.10218 | 0.203082 | 0.006949 |
| 0.5945 | 0.995 | 0.0039 | −0.04372 | 0.161116 | −0.00152 |
| 0.7621 | 0.952 | 0.0021 | 0.028101 | 0.103917 | −0.01128 |
| 0.9163 | 0.87 | 0.0017 | 0.105137 | 0.037876 | −0.02137 |
| 1.0263 | 0.757 | 0.0011 | 0.17426 | −0.02652 | −0.03012 |
| 1.0622 | 0.631 | 0.0008 | 0.219965 | −0.07579 | −0.03549 |
| 1.0026 | 0.503 | 0.0003 | 0.231689 | −0.1009 | −0.03614 |
| 0.8544 | 0.381 | 0.0002 | 0.209817 | −0.10109 | −0.03215 |
| 0.6424 | 0.265 | 0 | 0.163336 | −0.08281 | −0.02479 |
| 0.4479 | 0.175 | 0 | 0.116419 | −0.06083 | −0.01756 |
| 0.2835 | 0.107 | 0 | 0.074666 | −0.0397 | −0.01122 |
| 0.1649 | 0.061 | 0 | 0.04751 | −0.02348 | −0.00656 |
| 0.0874 | 0.032 | 0 | 0.023275 | −0.01255 | −0.00349 |
| 0.0468 | 0.017 | 0 | 0.012498 | −0.00676 | −0.00187 |
| 0.0227 | 0.0082 | 0 | 0.006074 | −0.0033 | −0.00091 |
| 0.0114 | 0.0041 | 0 | 0.003055 | −0.00166 | −0.00046 |

TABLE 3

| Wavelength (nanometers) | Fundamental Metamer | Radiometric Function | Black Metamer |
|---|---|---|---|
| 400 | 0.00500267 | 0.05127651 | 0.05077624 |
| 410 | 0.00152993 | 0.04801286 | 0.04648292 |
| 420 | 0.00479701 | 0.03440732 | 0.02961031 |
| 430 | 0.01056479 | 0.01135555 | 0.00079076 |
| 440 | 0.01401556 | 0 | −0.01492489 |
| 450 | 0.01543566 | 0 | −0.01801513 |
| 460 | 0.01650982 | 0 | −0.01656527 |
| 470 | 0.01603556 | 0.01489279 | −0.00114277 |
| 480 | 0.01569349 | 0.03563982 | 0.01994633 |
| 490 | 0.01737361 | 0.05361757 | 0.03624962 |
| 500 | 0.02292452 | 0.06344166 | 0.04051714 |
| 510 | 0.03280562 | 0.07155957 | 0.03875395 |
| 520 | 0.04383695 | 0.08080834 | 0.03697139 |
| 530 | 0.05105680 | 0.07674855 | 0.02569175 |
| 540 | 0.05429072 | 0.05796799 | 0.00367727 |
| 550 | 0.05413990 | 0.03629901 | −0.01784089 |
| 560 | 0.05118817 | 0.01484953 | −0.03633865 |
| 570 | 0.04547901 | 0.00469311 | −0.04078590 |
| 580 | 0.03760199 | 0.00413583 | −0.03346616 |
| 590 | 0.02859154 | 0.00952038 | −0.01907115 |
| 600 | 0.02011012 | 0.01472068 | −0.00538944 |
| 610 | 0.01322130 | 0.02258646 | 0.00936515 |
| 620 | 0.00830462 | 0.03363737 | 0.02533275 |
| 630 | 0.00490826 | 0.04486850 | 0.03996024 |
| 640 | 0.00281516 | 0.05184118 | 0.04902602 |
| 650 | 0.00154772 | 0.05553693 | 0.05398921 |
| 660 | 0.000882333 | 0.05849495 | 0.05767162 |
| 670 | 0.00041580 | 0.06196940 | 0.06155360 |
| 680 | 0.000214255 | 0.06616302 | 0.06594877 |
| 690 | 0.00010108 | 0.07132120 | 0.07122012 |
| 700 | 0.00000496 | 0.07693943 | 0.07688979 |

What is claimed is:

1. A method for encrypting and decrypting raw digital images comprising the steps of:
   using a cyclotomic polynomial to generate an encrypting algebraic transform;
   partitioning said raw digital images into data blocks;
   calculating encrypted data blocks with said encrypting algebraic transform and said data blocks; and
   calculating decrypted data blocks with the inverse of said encrypting algebraic transform and said encrypted data blocks.

2. The method of claim 1, wherein said using step includes the step of determining a mathematical algebraic equation representing said encrypting algebraic transform, and said mathematical algebraic equation is said cyclotomic polynomial.

3. The method of claim 1, wherein said using step includes the step of determining a mathematical algebraic equation representing said encrypting algebraic transform, and the coefficients of said mathematical algebraic equation are calculated with said cyclotomic polynomial.

4. The method of claim 1, wherein said using step includes the step of determining a mathematical algebraic equation representing said encrypting algebraic transform, and said mathematical algebraic equation is modulo said cyclotomic polynomial.

5. The method of claim 2, wherein said raw digital images are raw color digital images.

6. The method of claim 3, wherein said raw digital images are raw color digital images.

7. The method of claim 4, wherein said raw digital images are raw color digital images.

8. The method of claim 5, wherein said raw color digital images comprise a set of raw images in digital cinema.

9. The method of claim 6, wherein said raw color digital images comprise a set of raw images in digital cinema.

10. The method of claim 7, wherein said raw color digital images comprise a set of raw images in digital cinema.

11. A method for encrypting and decrypting raw digital images comprising the steps of:
    using a radiometric expression derived from said raw digital images to generate a bit sequence;
    partitioning said raw digital images into data blocks with length equal to the length of said bit sequence;

combining said bit sequence and said data blocks to form encrypted data blocks; and separating said bit sequence and said data blocks to form unencrypted data blocks.

12. The method of claim 11, wherein said bit sequence is used to calculate a base point.

13. The method of claim 12, wherein said raw digital images are raw color digital images.

14. The method of claim 13, wherein said raw color digital images comprise a set of raw images in digital cinema.

15. The method of claim 12, wherein said calculating base point step includes the steps of:

deriving a bitwise expression for said radiometric expression; and converting said bitwise expression to a high precision integer.

16. The method of claim 15, wherein said raw digital images are raw color digital images.

17. The method of claim 16, wherein said raw color digital images comprise a set of raw images in digital cinema.

18. The method of claim 11, wherein said radiometric expression is substantially a black metamer.

19. The method of claim 11, wherein said radiometric expression is substantially a fundamental metamer.

20. The method of claim 11, wherein said radiometric expression is substantially a radiometric function.

21. A method for encrypting and decrypting raw digital images comprising the steps of:

using a cyclotomic polynomial to generate an encrypting algebraic transform;

partitioning said raw digital images into data blocks;

calculating encrypted data blocks with said encrypting algebraic transform, said data blocks and a radiometric expression derived from said raw digital images; and calculating decrypted data blocks with the inverse of said encrypting algebraic transform and said encrypted data blocks.

22. The method of claim 21, wherein said calculating encrypted data blocks step includes the step of combining said data blocks with said radiometric expression.

23. The method of claim 22, wherein said combining step includes the steps of:

deriving a bitwise expression for said radiometric expression; and combining said bitwise expression and said data blocks with an exclusive-or mathematical operation.

24. The method of claim 23, wherein said raw digital images are raw color digital images.

25. The method of claim 24, wherein said raw color digital images comprise a set of raw images in digital cinema.

26. The method of claim 22, wherein said radiometric expression is substantially a fundamental metamer.

27. The method of claim 22, wherein said radiometric expression is substantially a black metamer.

28. The method of claim 22, wherein said radiometric expression is substantially a radiometric function.

* * * * *